(12) United States Patent
Lee et al.

(10) Patent No.: US 8,270,363 B2
(45) Date of Patent: Sep. 18, 2012

(54) METHOD FOR TRANSMITTING AND RECEIVING CONTROL INFORMATION THROUGH PDCCH

(75) Inventors: Dae Won Lee, Gyeonggi-do (KR); Ki Jun Kim, Gyeonggi-do (KR); Dong Wook Roh, Gyeonggi-do (KR); Yu Jin Noh, Gyeonggi-do (KR); Joon Kui Ahn, Gyeonggi-do (KR); Jung Hoon Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/185,362

(22) Filed: Jul. 18, 2011

(65) Prior Publication Data

US 2011/0274005 A1 Nov. 10, 2011

Related U.S. Application Data

(63) Continuation of application No. 12/963,588, filed on Dec. 8, 2010, now Pat. No. 8,014,769, which is a continuation of application No. 12/252,270, filed on Oct. 15, 2008, now Pat. No. 7,873,004.

(60) Provisional application No. 61/029,576, filed on Feb. 19, 2008, provisional application No. 61/037,000, filed on Mar. 17, 2008.

(30) Foreign Application Priority Data

Jul. 15, 2008 (KR) ........................ 10-2008-0068633

(51) Int. Cl.
*H04W 4/00* (2009.01)
*H04B 7/00* (2006.01)
(52) U.S. Cl. .................. 370/329; 455/507; 455/422
(58) Field of Classification Search .................. 455/450, 455/422.1, 522, 67.11, 456.1; 370/311, 252, 370/280, 329, 336; 375/262, 299, 295
See application file for complete search history.

(56) References Cited

U.S. PATENT DOCUMENTS

2005/0025254 A1* 2/2005 Awad et al. .................. 375/295
(Continued)

FOREIGN PATENT DOCUMENTS

EP 1988667 11/2008
(Continued)

OTHER PUBLICATIONS

Motorola, "Search Space Definition for L1/L2 Control Channels," R1-073373, 3GPP TSG RAN1#50, Aug. 2007.
(Continued)

*Primary Examiner* — Kiet Doan
(74) *Attorney, Agent, or Firm* — Lee, Hong, Degerman, Kang & Waimey

(57) ABSTRACT

A method for efficiently transmitting and receiving control information through a Physical Downlink Control Channel (PDCCH) is provided. When a User Equipment (UE) receives control information through a PDCCH, the received control information is set to be decoded in units of search spaces, each having a specific start position in the specific subframe. Here, a modulo operation according to a predetermined first constant value (D) is performed on an input value to calculate a first result value, and a modulo operation according to a predetermined first variable value (C) corresponding to the number of candidate start positions that can be used as the specific start position is performed on the calculated first result value to calculate a second result value and an index position corresponding to the second result value is used as the specific start position. Transmitting control information in this manner enables a plurality of UEs to efficiently receive PDCCHs without collisions.

16 Claims, 14 Drawing Sheets

U.S. PATENT DOCUMENTS

| | | | |
|---|---|---|---|
| 2008/0273479 A1* | 11/2008 | Kwak et al. | 370/311 |
| 2009/0003274 A1 | 1/2009 | Kwak et al. | |
| 2009/0003486 A1* | 1/2009 | Kwon et al. | 375/299 |
| 2009/0011767 A1* | 1/2009 | Malladi et al. | 455/450 |
| 2009/0022110 A1 | 1/2009 | Muharemovic et al. | |
| 2009/0046793 A1 | 2/2009 | Love et al. | |
| 2009/0088148 A1 | 4/2009 | Chung et al. | |
| 2009/0154607 A1 | 6/2009 | Lindoff et al. | |
| 2009/0161618 A1 | 6/2009 | Johansson et al. | |
| 2009/0197542 A1 | 8/2009 | Buckley et al. | |
| 2009/0197630 A1 | 8/2009 | Ahn et al. | |
| 2009/0238091 A1 | 9/2009 | Kim et al. | |
| 2011/0077039 A1 | 3/2011 | Lee et al. | |

FOREIGN PATENT DOCUMENTS

| | | |
|---|---|---|
| KR | 1020020094076 | 12/2002 |
| KR | 1020030027606 | 4/2003 |
| KR | 1020030039850 | 5/2003 |
| KR | 1020040079660 | 9/2004 |
| WO | 98/44685 | 10/1998 |

OTHER PUBLICATIONS

NEC Group, "DL Control Channel Structure: CCE Aggregation and Blind Detections," R1-073456, TSG-RAN WG1#50, Aug. 2007.

Motorola, "Search Space Definition: Reduced PDCCH Blind Detection for Split PDCCH Search Space," R1-073996, 3GPP TSG RAN1#50bis, Oct. 2007.

Mitsubishi Electric, "Blind detection complexity reduction with UE specific PDCCH scrambling," R1-080405, 3GPP TSG RAN WG1 #51bis meeting, Jan. 2008.

Ericsson, "PDCCH blind decoding—Outcome of offline discussions," R1-081101, Feb. 2008.

Qualcomm Europe, "Remaining issues on PDCCH search space definitions," R1-081481, 3GPP TSG RAN1 #52bis, Mar. 2008.

LG Electronics, "Randomization Function for PDCCH search space," R1-081567, 3GPP TSG RAN WG1#52bis, Mar. 2008.

Motorola, "Search Space Definition:Reduced PDCCH Blind Detection for Split PDCCH Search Space", 3GPP TSG RAN1#51, R1-074583, Nov. 2007.

Panasonic, "System Level Analysis for CCE Aggregation Size Dependent Transport Format Signaling", 3GPP TSG-RAN WG1 Meeting #51, R1-074910, Nov. 2007.

* cited by examiner

METHOD FOR TRANSMITTING AND RECEIVING CONTROL INFORMATION THROUGH PDCCH

CROSS-REFERENCE TO RELATED APPLICATIONS

This application is a continuation of U.S. application Ser. No. 12/963,588, filed on Dec. 8, 2010, now U.S. Pat. No. 8,014,769, which is a continuation of U.S. application Ser. No. 12/252,270, filed on Oct. 15, 2008, now U.S. Pat. No. 7,873,004, which claims the benefit of the Korean Patent Application No. 10-2008-0068633, filed on Jul. 15, 2008, which are hereby incorporated by reference as if fully set forth herein. U.S. application Ser. No. 12/252,270 also claims the benefit of U.S. Provisional Application Ser. Nos. 61/029,576, filed on Feb. 19, 2008 and 61/037,000, filed on Mar. 17, 2008, the contents of which are hereby incorporated by reference herein in their entirety.

BACKGROUND OF THE INVENTION

1. Field of the Invention

The present invention relates to mobile communication technologies, and more particularly, to a method for efficiently transmitting and receiving control information through a Physical Downlink Control Channel (PDCCH).

2. Discussion of the Related Art

The following description can be applied to various mobile communication methods. However, a description will be given, particularly with reference to Third Generation Partnership Project Long Term Evolution (3GPP LTE) technologies.

3GPP LTE is a project for improving the UMTS mobile station standard to cope with future technology development in the Third Generation Partnership Project (3GPP). 3GPP LTE has evolved to Release 8 which is an improved version of the 3GPP standard.

In the 3GPP LTE communication system, various channels are defined for uplink and downlink in the physical layer used in actual signal transmission. For example, a Physical Uplink Shared Channel (PUSCH), a Physical Uplink Control Channel (PUCCH), and a Physical Random Access Channel (PRACH) are defined as uplink physical channels, and a Physical Downlink Shared Channel (PDSCH), a Physical Multicast Channel (PMCH), a Physical Broadcast Channel (PBCH), a Physical Control Format Indicator Channel (PCFICH), a Physical Downlink Control Channel (PDCCH), and a Physical Hybrid ARQ (HARQ) Indicator Channel (PHICH) are defined as downlink physical channels. In the following description, the word "physical" will be omitted for ease of explanation unless the omission causes confusing.

Among the various channels, the PDCCH serves to transmit scheduling allocation control information and other control information. In a cellular communication system in which one base station (or Node-B) controls a plurality of User Equipments (UEs) or (mobile stations), multiple UEs can receive control information through a PDCCH transmitted from the base station. Here, since there is a limit to the number of PDCCHs that the base station can transmit at once, the base station does not previously allocate different PDCCHs to each UE but transmits control information through an arbitrary PDCCH to an arbitrary UE at each time. Thus, the UE determines whether or not control information received through the PDCCH belongs to the UE based on a UE identifier included in the PDCCH. At each time, the UE performs decoding on each of a plurality of PDCCHs (for a plurality of possible PDCCH formats) and receives, when it is determined that the PDCCH corresponds to the UE, control information included in the PDCCH and operates according to the control information.

However, the number of combinations of PDCCH regions for transmission of control information may be great. Excessive UE processing performance may be required for the UE to decode all PDCCH regions. Accordingly, there is a need to limit PDCCH regions to be decoded by each UE to reduce the number of times the UE performs decoding and thus to reduce power consumption of the UE.

SUMMARY OF THE INVENTION

An object of the present invention devised to solve the problem lies in providing a technology for efficiently transmitting and receiving control information through a Physical Downlink Control Channel (PDCCH).

Another object of the present invention devised to solve the problem lies in providing a technology for efficiently setting a different start position of a search space for each UE in order to transmit and receive control information to and from each UE through a different search space.

The object of the present invention can be achieved by providing a method for a User Equipment (UE) to receive control information through a Physical Downlink Control Channel (PDCCH), the method including receiving control information from a base station through a PDCCH in units of Control Channel Element (CCE) aggregations, each including at least one CCE in a control region of a specific subframe; and decoding the received control information in units of search space in the specific subframe, wherein a modulo operation according to a predetermined first constant value (D) is performed on an input value to calculate a first result value, and a modulo operation according to a predetermined first variable value (C) defined by the equation of $$C = \mathrm{floor}(N_{CCE}/L_{CCE})$$

is performed on a value corresponds to the calculated first result value to calculate a second result value and the search space starts with an index position corresponding to the second result value (where $N_{CCE}$ represents the total number of CCEs in the specific subframe, and $L_{CCE}$ is the number of CCEs included in the CCE aggregation, and floor(x) is a largest integer that is equal to or less than x).

In another aspect of the present invention, provided herein is a method for a base station to transmit control information through a Physical Downlink Control Channel (PDCCH), the method including transmitting control information for a specific User Equipment (UE) through a PDCCH in units of Control Channel Element (CCE) aggregations, each including at least one CCE in a control region of a specific subframe, wherein the control information for the specific UE is transmitted in units of search space in the specific subframe, and wherein a modulo operation according to a predetermined first constant value (D) is performed on an input value to calculate a first result value, and a modulo operation according to a predetermined first variable value (C) defined by the equation of $$C = \mathrm{floor}(N_{CCE}/L_{CCE})$$

is performed on a value corresponds to the calculated first result value to calculate a second result value and the search space starts with an index position corresponding to the second result value.

In the above methods, preferably, the first constant value (D) is predetermined to be higher than the first variable value (C).

In addition, it may be advantageous that the input value for a "k+1"th subframe is set to correspond to the first result value for a "k"th subframe, where "k" is a non-negative integer.

On the other hand, in the above methods, an identification information value of the UE may be used for the input value for a 1st subframe.

In addition, the first result value may be calculated by multiplying the input value by a predetermined second constant value (A), adding a predetermined third constant value (B), which result in a intermediate value, and performing the modulo operation according to the first constant value (D) on the intermediate value.

In this case, preferably, the first constant value (D), the second constant value (A), and the third constant value (B) are 65537, 39827, and 0, respectively.

In an embodiment of the present invention, when the specific subframe is the "k"th subframe, the first constant value is "D", and the first constant value is "C", the search space starts with a specific start position $Z_k$ in the "k"th subframe, the specific start position $Z_k$ in the "k"th subframe is set as an index position corresponding to a value determined by $Z_k=[A \cdot y_k+B] \bmod D] \bmod C$ and $y_k=(A \cdot y_{k-1}+B) \bmod D$, where A and B denote predetermined constant values and "k" denotes a subframe index.

In this case, the first constant value "D" may be 65537, and the predetermined constant values "A" and "B" may be 39827 and 0, respectively.

Here, the index position corresponding to the determined value may correspond to a start position of a CCE aggregation corresponding to the determined value under the assumption that indices are assigned on a CCE aggregation basis. According to the embodiments of the present invention described above, it is possible to efficiently transmit and receive control information through a Physical Downlink Control Channel (PDCCH).

Specifically, a different start position of a search space can be set for each UE so that control information can be transmitted and received to and from each UE through a different search space.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

When a UE decodes all PDCCH regions, the complexity of the UE and battery consumption are increased. Therefore, it is necessary to specify a PDCCH decoding region for each UE. To accomplish this, there is a need to study in more detail a resource space through which the PDCCH is transmitted.

A PDCCH can be transmitted through a CCE aggregation including one or more Control Channel Elements (CCEs). In addition, a plurality of PDCCHs can be transmitted in one subframe. Here, the term "CCE" refers to a resource unit for transmission of control information, which is a unit corresponding to a specific number of resource elements in the resource space. A detailed description of the concept of the CCE is omitted herein since it is apparent to those skilled in the art.

PDCCH formats can be classified as follows according to the size of a CCE aggregation used for PDCCH transmission as described above.

TABLE 1

| PDCCH format | Number of CCEs |
|---|---|
| 0 | 1 |
| 1 | 2 |
| 2 | 4 |
| 3 | 8 |

Figure 1:
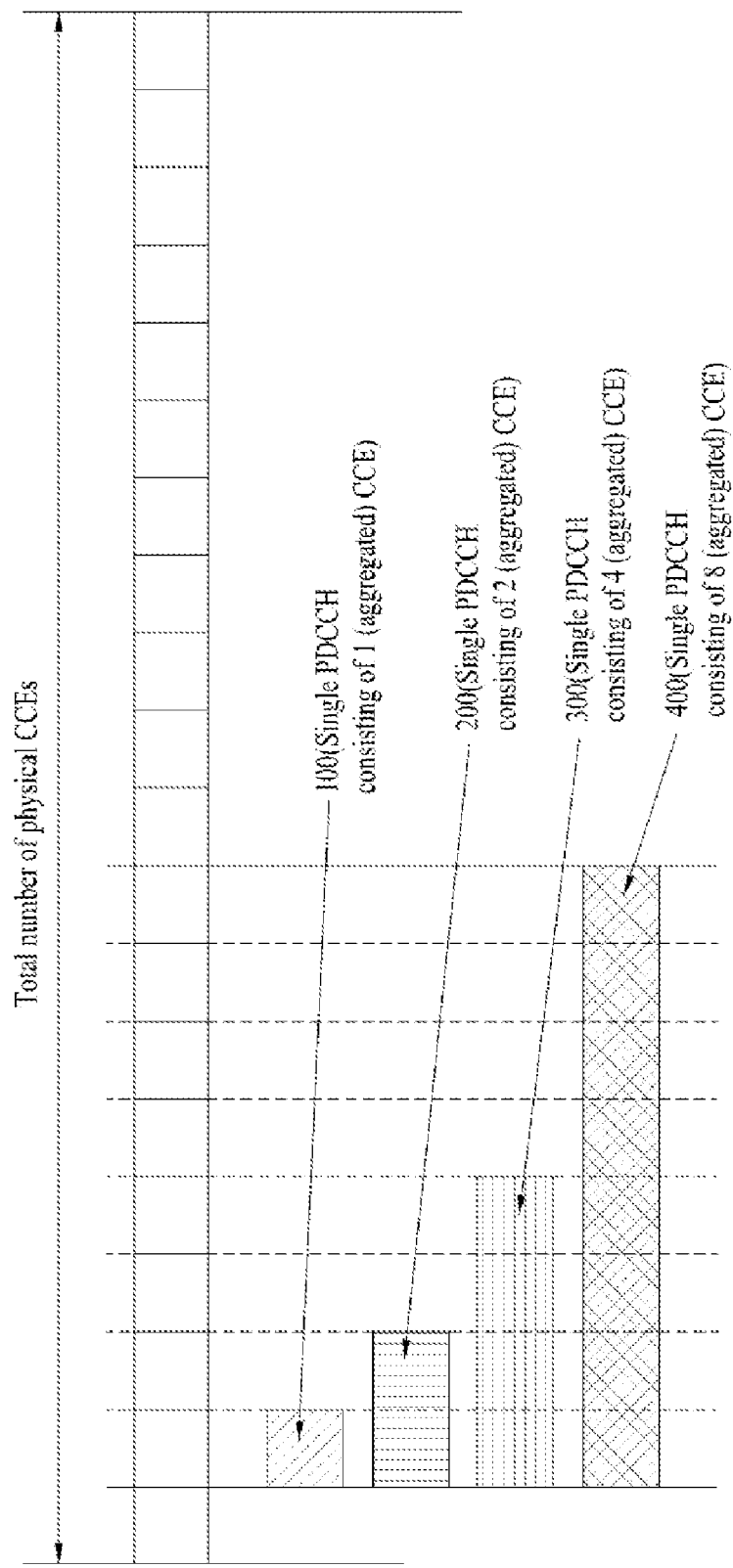
FIG. 1 illustrates an example of a CCE aggregation through which one PDCCH can be transmitted.

FIG. 1 illustrates an example of a CCE aggregation through which one PDCCH can be transmitted.

The term "Total Number of CCEs" in FIG. 1 refers to the number of CCEs included in one subframe. However, the number of CCEs included in one subframe may vary according to system requirements. In FIG. 1, a reference numeral "100" denotes a format (PDCCH format 1 in Table 1) in which one PDCCH is transmitted through one CCE, a reference numeral "200" denotes a format (PDCCH format 2 in Table 1) in which one PDCCH is transmitted through 2 CCEs, a reference numeral "300" denotes a format (PDCCH format 3 in Table 1) in which one PDCCH is transmitted through 4 CCEs, and a reference numeral "400" denotes a format (PDCCH format 4 in Table 1) in which one PDCCH is transmitted through 8 CCEs.

That is, as shown in FIG. 1, the size of a CCE aggregation used to transmit one PDCCH may vary depending on channel environments of each UE as shown in FIG. 1. In the following description, the number of CCEs used to transmit one PDCCH will be referred to as a "CCE aggregation level". Thus, when each UE decodes a PDCCH, the UE must determine the size of a decoding region for each CCE aggregation level.

Figure 2:
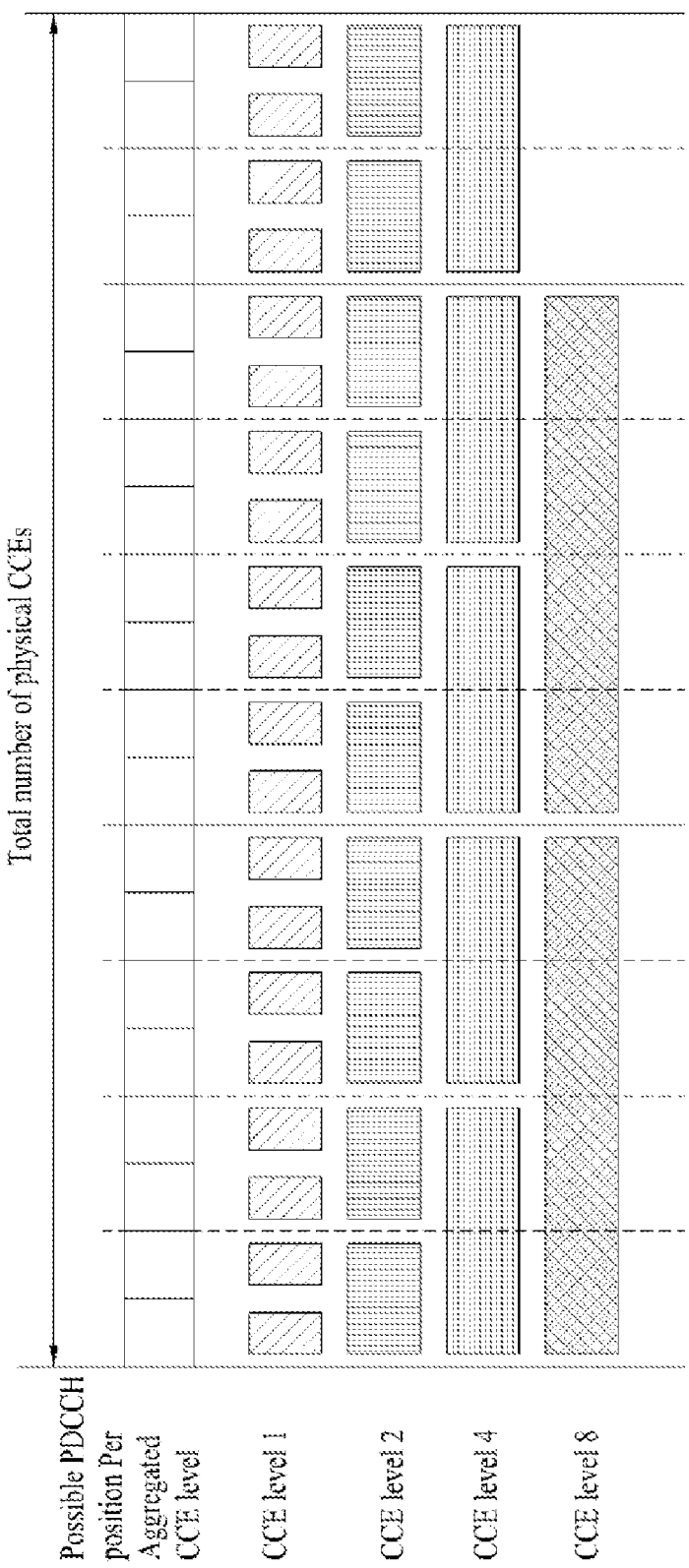
FIG. 2 illustrates all possible decoding regions that the UE needs to attempt to decode taking into consideration the CCE aggregation level.

FIG. 2 illustrates all possible decoding regions that the UE needs to attempt to decode taking into consideration the CCE aggregation level.

The number of all possible decoding regions that a UE needs to attempt to decode according to a CCE aggregation level set in the system may be too great as can be seen from FIG. 2. Therefore, it is preferable that a region (a combination of CCE aggregations through which the base station may have transmitted a PDCCH to the UE) that the UE needs to attempt to decode be preset for each UE to limit the number of times the UE has to decode in order to receive a PDCCH.

However, the following must be considered when the PDCCH decoding region is limited. If all different UEs decode the same limited PDCCH decoding region, the base station must transmit PDCCHs to all UEs only through the limited region. Thus, the number of UEs that are simultaneously controllable is restricted since the base station transmits PDCCHs only through the limited region instead of using all available CCEs.

This restriction can be removed if different PDCCH decoding regions (or spaces) are allocated to different UEs. That is, the base station can more efficiently transmit PDCCHs to a number of UEs as the number of UEs which do not have an overlapping PDCCH decoding region increases.

Figure 3:
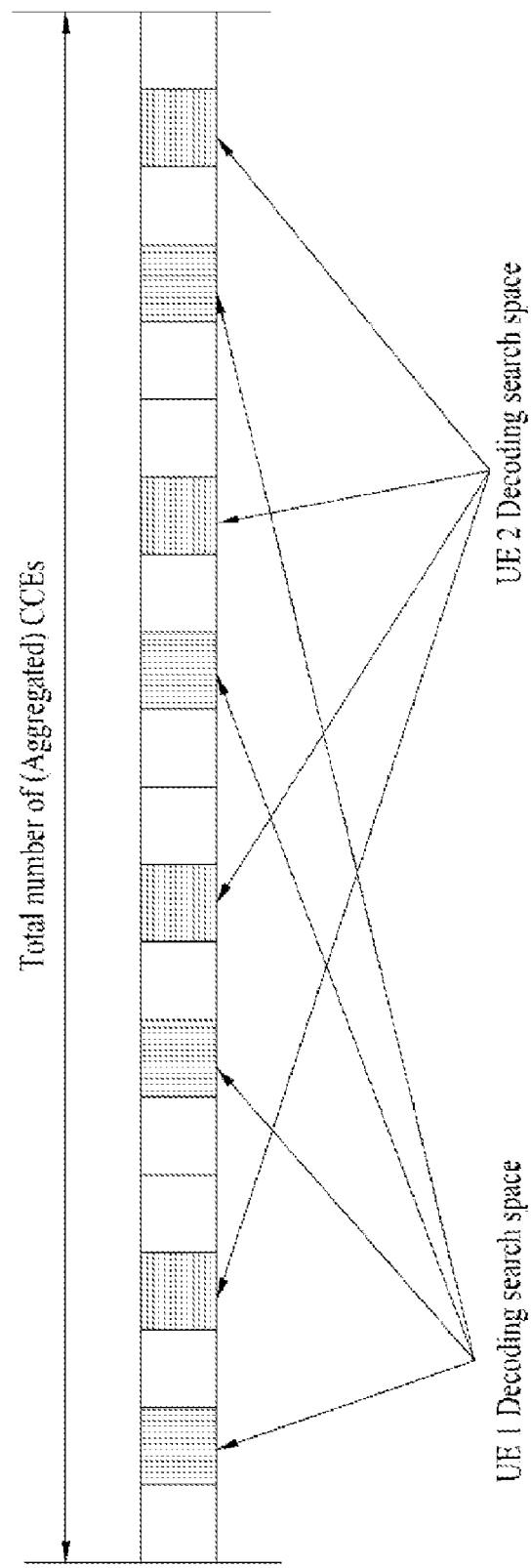
FIG. 3 illustrates an example wherein two different UEs have different decoding regions under a specific CCE aggregation level condition.

FIG. 3 illustrates an example wherein two different UEs have different decoding regions under a specific CCE aggregation level condition.

In the following description, a region that each UE needs to attempt to decode to receive a PDCCH is referred to as a "search space". In the example of FIG. 3, both a UE 1 and a UE 2 have a CCE aggregation level 1 but have different decoding search spaces. That is, the base station can simultaneously transmit a PDCCH to the UE1 and the UE2 since the decoding search spaces do not overlap as shown in FIG. 3.

The following methods can be employed to set a different search space to each UE.

In the first method, a search space having a different start point (or start position) and a predetermined number of CCEs arranged starting from the start point is allocated to each UE so that each UE has a different search space.

In the second method, a search space having a different start point and a predetermined number of CCEs arranged at regular intervals starting from the start point is allocated to each UE so that each UE has a different search space.

These two methods are similar in that the overlapping PDCCH decoding region can be reduced if the search space of each UE has a different start position. Accordingly, an embodiment of the present invention suggests that different UE search spaces be set to have different start positions as described above to minimize overlapping of search spaces that UEs need to attempt to decode in order to receive a PDCCH. Reducing overlapping of PDCCH decoding regions in this manner increases the number of UEs to which the base station can simultaneously transmit control information through scheduling.

An embodiment of the present invention suggests that a UE identification number that enables identification of each UE from each other be used to generate a different start position value for each UE as described above. It is preferable that as many different values (or numbers) as possible be generated for UEs. Thus, each generated value will be referred to as an "identification dependent randomization number".

Figure 4:
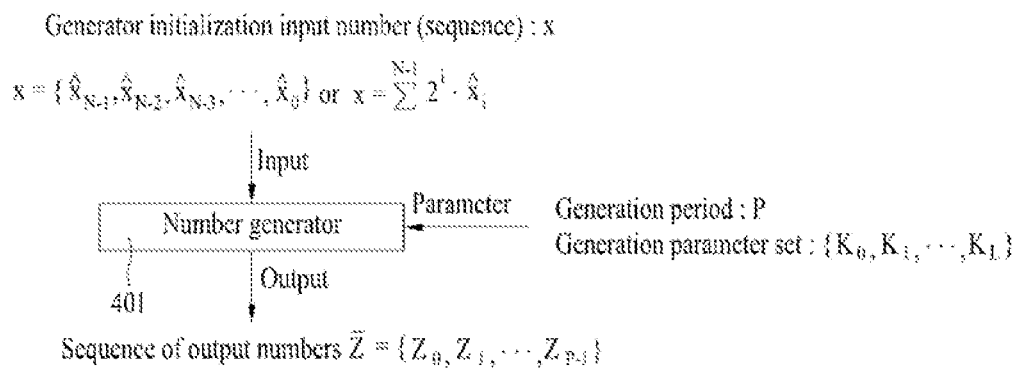
FIG. 4 illustrates the principle of a generator that generates identification dependent randomization numbers according to an embodiment of the present invention.

FIG. 4 illustrates the principle of a generator that generates identification dependent randomization numbers according to an embodiment of the present invention.

Specifically, a generator 401 receives an input value x and generates an output value $Z_j$ or an output sequence Z according to a generation parameter set $\{K_0, K_0, \ldots K_L\}$ of the generator 401. Although the number of parameters used in the generator is L+1 in the example of FIG. 4, the number and type of the used parameters may vary and will be described in more detail in each embodiment of the present invention described below.

The value generated by the generator 401 may be a binary sequence or may be an integer value into which all or part of the binary sequence is converted.

Figure 5:
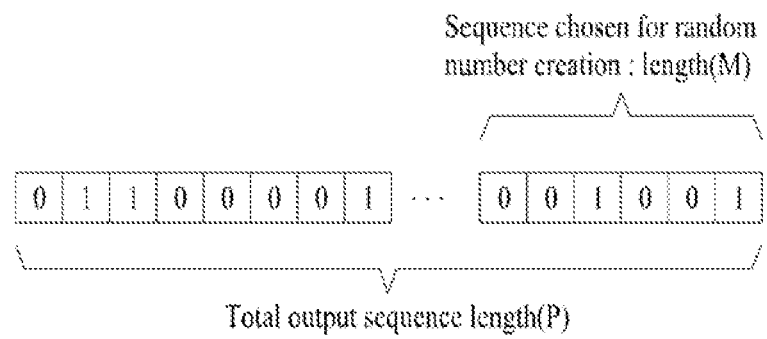
FIGS. 5 and 6 illustrate an example wherein a part of a binary sequence generated by the generator is selected as an initial value according to an embodiment of the present invention.
Figure 6:
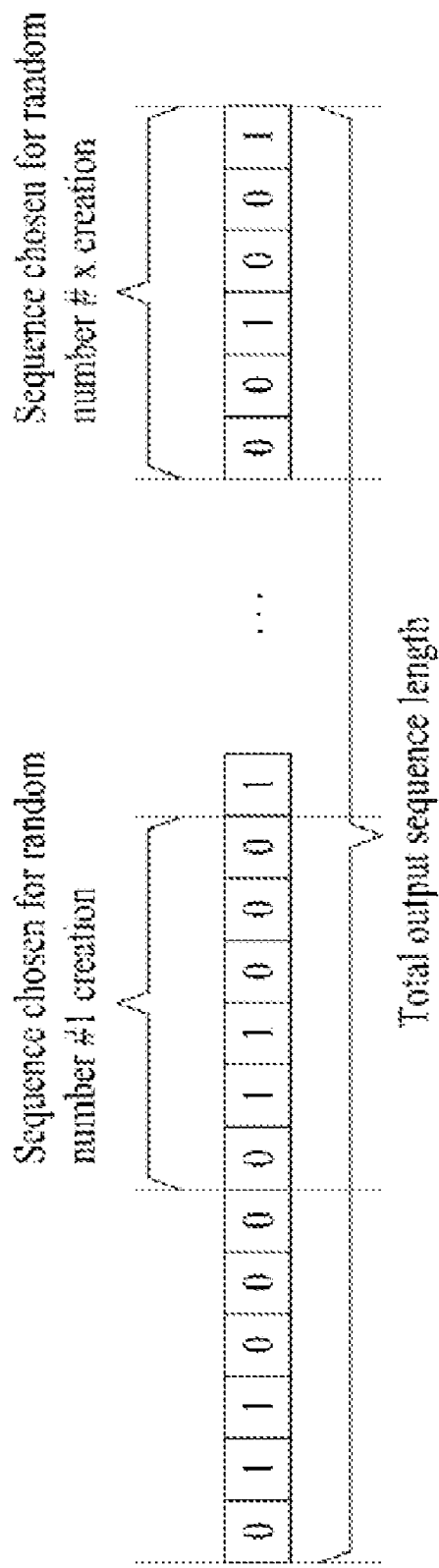

FIGS. 5 and 6 illustrate an example wherein a part of a binary sequence generated by the generator is selected as an initial value according to an embodiment of the present invention.

That is, as shown in FIG. 5, an M-length binary value for use as an identification dependent randomization number can be selected from a P-length binary sequence generated by the generator 401 described above with reference to FIG. 4. According to this embodiment, a number of identification dependent randomization numbers can be generated after a binary sequence is generated from a specific initial value. That is, as shown in FIG. 6, partial binary sequences that do not overlap can be selected from the binary sequence generated by the generator 401 and a number of identification dependent randomization numbers can then be generated from the selected binary sequences. Although X identification dependent randomization numbers are generated in the example of FIG. 6, the present invention is not necessarily limited to this example.

When the M-length binary sequence selected for calculating an identification dependent randomization number is represented by $\{\hat{y}_0, \hat{y}_1, \hat{y}_2, \ldots, \hat{y}_{M-1}\}$, this can be used to convert the identification dependent randomization number (i.e., the start position information) into an integer value $Z_K$.

MATHEMATICAL EXPRESSION 1

$$Z_k = \left(\sum_{i=0}^{M-1} 2^i \cdot \hat{y}_i\right) \bmod C$$

$$y_k = \sum_{i=0}^{M-1} 2^i \cdot \hat{y}_i$$

OR

-continued $$Z_k = \left(\sum_{i=0}^{M-1} 2^{M-1-i} \cdot \hat{y}_i\right) \bmod C$$

$$y_k \equiv \sum_{i=0}^{M-1} 2^{M-1-i} \cdot \hat{y}_i$$

Here, it is assumed that a subscript "k" represents a subframe index and "C" is defined as the number of candidate positions that can be used as start positions. That is, Mathematical Expression 1 represents that a specific-length binary sequence selected from a binary sequence generated by the generator is converted into an integer value and the integer value is modded with the number of all possible initial positions "C" to generate a start position value.

Specifically, in an embodiment of the present invention, the value "C" for a PDCCH to be currently received can be set to be equal to a value obtained by dividing the total number of physical CCEs by a CCE aggregation level (for example, 1, 2, 4, or 8) which is the number of CCE aggregations that can be used to transmit one PDCCH. If the total number of physical CCEs that can be used for PDCCH transmission is indivisible by the number of CCEs belonging to one PDCCH, the value "C" can be quantized to the number of possible candidate positions based on the above principle. Specifically, this embodiment suggests that the value "C" be obtained using the following equation.

$$C = \mathrm{floor}(N_{CCE}/L_{CCE}), \qquad \text{MATHEMATICAL EXPRESSION 2}$$

where "floor(x)" represents a function to quantize "x" to a largest integer that is equal to or less than "x", $N_{CCE}$ represents the total number of CCEs in a specific subframe, and $L_{CCE}$ is the number of CCEs that are used to transmit one PDCCH.

On the other hand, the generator 401 illustrated in FIG. 4 generates values having a period P. Accordingly, in an embodiment of the present invention, it is taken into consideration that P identification dependent randomization numbers are generated through a value generated through one initial input value. That is, identification dependent randomization numbers may be generated by performing the binary sequence selection and integer conversion described above on a binary sequence generated through one initialization. Alternatively, a total of P identification dependent randomization numbers such as $\{Z_0, Z_1, Z_2, \ldots, Z_{p-1}\}$ may be generated directly from an input initial value.

Communication systems generally operate at preset timings and at intervals of a preset period.

Figure 7:
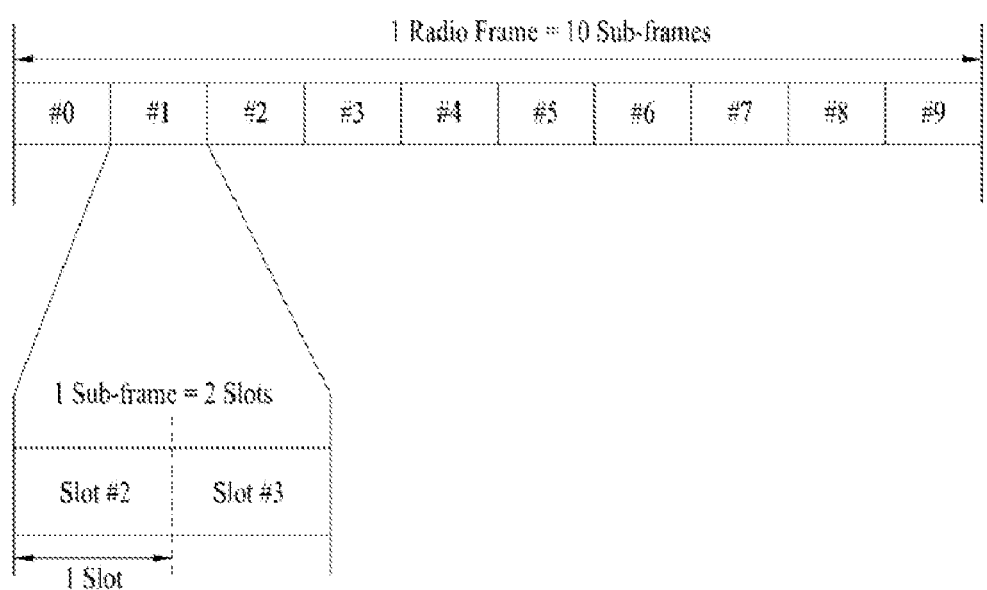
FIG. 7 illustrates a frame structure in the 3GPP LTE system for explaining an example in which a communication system operates at regular intervals

FIG. 7 illustrates a frame structure in the 3GPP LTE system for explaining an example in which a communication system operates at regular intervals.

Specifically, as shown in FIG. 7, the communication system operates at intervals of a period of "10 ms". Here, the period "10 ms" can be referred to as a radio frame. In this system, one radio frame includes 10 subframes, each having a length of "1 ms". Each subframe may have a structure including 0.5 ms slots.

In the example shown in FIG. 7, when randomization effects are achieved using identification dependent randomization numbers, the generated values may also be handled at intervals of 10 ms since the system illustrated in FIG. 7 operates at intervals of 10 ms. That is, a system in which an identification dependent randomization number is required for each subframe may be set to generate a sequence including 10 numbers so that the same sequence is used every period of 10 ms. Alternatively, the system may operate such that a value is generated 10 times every subframe in a radio frame and values are generated in the same manner in a next radio frame so that the same identification dependent randomization number is actually generated at intervals of 10 ms.

Reference will now be made to a method in which a start position for use in PDCCH search is generated directly from an initial input value based on an identification number. In the following, a first embodiment is described as a preferred embodiment of the present invention and second to fourth embodiments are described as other embodiments that can be implemented according to a similar principle.

First Embodiment

This embodiment suggests that a value obtained by performing a first modulo operation of an input value of "x" with a predetermined constant value of "D" and then performing a second modulo operation of the resulting value with a variable value of "C" corresponding to the number of candidate start positions that can be used as start positions is used as a search space start position for control information search.

Specifically, this embodiment suggests that a start position be determined in the following manner.

$$Z_k = [(A \cdot y_k + B) \bmod D] \bmod C$$

$$y_0 = x, \quad y_k = (A \cdot y_{k-1} + B) \bmod D$$

$$k = 0, 1, \ldots, P-1 \qquad \text{MATHEMATICAL EXPRESSION 3}$$

More specifically, this embodiment suggests that an initial value "x" be input and then be multiplied by "A" and the sum of the initial value "x" multiplied by "A" and a constant "D" be modded with a variable "C" to generate a final integer as a start position value of a search space. The finally generated value $Z_k$ in Mathematical Expression 3 indicates a start position of a PDCCH search space in a subframe corresponding to an index "k".

The following two methods can be used to calculate a search space start position of a different subframe from the subframe corresponding to the index "k".

In the first method, for each subframe, a different initial value is input to generate a start position value. That is, a different value such as $x_0, x_1, x_k, \ldots$ is sequentially input as an initial value for each subframe having an index of k to calculate a start position $Z_k$ of a search space of the subframe. In the second method, an intermediate value generated by inputting an initial value is used as an initial value for the next subframe to generate a start position value. That is, a value of $y_{k-1}$ for a subframe having an index of k−1 is used as an input value for a subframe having an index of k.

The above Mathematical Expression 3 according to this embodiment uses the second method. Specifically, as shown in Mathematical Expression 3, a value obtained by multiplying an intermediate value $y_{k-1}$ by a predetermined constant "A", adding the intermediate value $y_{k-1}$ multiplied by "A" to a constant "B", and then modding the resulting value with a constant "D" is used as an initial value $y_k$.

The value corresponding to the number of candidate start positions "C" as defined in the above Mathematical Expression 2 can also be used in this embodiment.

In this embodiment, the purpose of performing a modulo operation with the value "C" defined as in Mathematical Expression 2 is to obtain an output value that is one of the candidate start positions. The following is the reason for performing another modulo operation with "D" before the modulo operation with "C" to obtain a value within a desired range.

Even when values of "Ax+B" are different in Mathematical Expression 3, there is high possibility that corresponding final values obtained by performing a modulo operation of the values "Ax+B" with "C" are likely to be equal if the value "C" is small. The possibility that different values of "Ax+B" cause collision such that they produce the same final value through the modulo operation with the small value "C" can be reduced by performing another modulo operation with the predetermined constant "D". Here, it is preferable that the predetermined constant "D" be set to be higher than the value "C" to reduce the possibility that different values of "Ax+B" cause collision as described above.

In this embodiment, it is assumed that the finally obtained search space start position $Z_k$ in the subframe corresponding to the index "k" indicates a corresponding one of the indices assigned to CCE aggregations corresponding to the CCE aggregation level. That is, when the CCE aggregation level is "2", indices for CCE aggregations are assigned on a 2-CCE basis. Accordingly, the value $Z_k$ obtained according to this embodiment indicates a corresponding one of the CCE aggregation indices assigned as described above.

Second Embodiment

Unlike the first embodiment, the finally obtained search space start position $Z_k$ in the subframe corresponding to the index "k" may indicate a corresponding CCE position based on an index assigned to each CCE rather than an index assigned to each CCE aggregation. That is, when the CCE aggregation level is "2", a CCE aggregation index may be assigned on a CCE basis rather than on a 2-CCE basis. Accordingly, this embodiment suggests that a value calculated through the following equation be used as a start position of a PDCCH search space under the same condition as in the first embodiment.

$$Z_k = L_{CCE} \cdot [A \cdot y_k + B) \bmod D] \bmod C$$

$$y_0 = x, y_k = (A \cdot y_{k-1} + B) \bmod D$$

$$k = 0, 1, \ldots, P-1 \quad \text{MATHEMATICAL EXPRESSION 4}$$

When Mathematical Expression 4 is compared with Mathematical Expression 3 according to the first embodiment, it can be seen that a final value $Z_k$ according to Mathematical Expression 4 is obtained by multiplying the final value $Z_k$ generated according to Mathematical Expression 3 by $L_{CCE}$. That is, the value calculated according to Mathematical Expression 3 is multiplied by the number of CCEs $L_{CCE}$ included in one CCE aggregation according to the CCE aggregation level to generate a value that can be used as a start position of a search space that is also appropriate for a system in which indices are assigned on a CCE basis.

Third Embodiment

In the above Mathematical Expressions 3 and 4, it is assumed that k starts from "0". However, the index "k" may also be defined to start from "−1". In this case, Mathematical Expressions 3 and 4 can be expressed as follows.

$$Z_k = (Y_k \bmod \lfloor N_{CCE,k}/L \rfloor)$$

$$Y_k = (A \cdot Y_{k-1}) \bmod D \quad \text{MATHEMATICAL EXPRESSION 5}$$

$$Z_k = L \cdot (Y_k \bmod \lfloor N_{CCE,k}/L \rfloor)$$

$$Y_k = (A \cdot Y_{k-1}) \bmod D \quad \text{MATHEMATICAL EXPRESSION 6}$$

In Mathematical Expressions 5 and 6, it is assumed that $Y_{-1} = n_{RNTI} \neq 0$ and $n_{RNTI}$ corresponds to a UE ID.

Specifically, Mathematical Expression 5 is equivalent to Mathematical Expression 3 with k starting from −1 and Mathematical Expression 6 is equivalent to Mathematical Expression 4 with k starting from −1.

Fourth Embodiment

This embodiment suggests a second method for calculating a start position of a PDCCH search space in which the following equation is used unlike those used in the first to third embodiments.

$$Z_k = ((A \cdot x_k + B \cdot x_k^2) \bmod D) \bmod C \quad \text{MATHEMATICAL EXPRESSION 7}$$

That is, this embodiment suggests that a start position value be generated using a quadratic generation equation as shown in Mathematical Expression 7 as an input value. Here, the input value may be used in both the method in which a new value is input for each generation of a subframe value and the method in which a value generated in a kth generation is used as an input value for a k+1th generation.

On the other hand, a preferred embodiment of the present invention suggests that a number, which is 1 greater than the largest number that the initial value may have, (i.e., a value indicating the range of numbers that the initial value may have) be used as the value "D" in Mathematical Expression 7.

In the above embodiments, it is assumed that UE identification information is used as the initial input value. However, another aspect of the present invention suggests that the initial input value be used in various forms to enable efficient PDCCH transmission and detection.

The basic purpose of each embodiment of the present invention is to generate a different value for any specific identification number, which will also be referred to as an "ID" for short, and thus it is preferable to select an initial value which maximizes randomization effects according to the ID.

Since the purpose of each embodiment of the present invention is to impart randomization effects of PDCCH decoding regions between UEs and a base station and it is not necessary to take into consideration randomization effects between base stations, ID values for identifying UEs such as UE identification numbers (for example, a C-RTNI or a temporary-RNTI) can be selected as initial values. Specifically, all of the following information items or combinations thereof can be used to create initial values.

1. UE ID
2. CCE aggregation Level ($L_{CCE}$)
3. Subframe Number (or Slot Number)

According to the present invention, when a sequence is generated as an ID dependent random number synchronously with the timings of radio frames, both the method in which a start position value is generated using a different initial value every subframe, and the method in which a start position value is generated synchronously with the timings of radio frames and a new ID dependent random number is then generated using the generated start position value or the intermediate value, may be employed as described above.

In the method in which an initial value is input every subframe to generate an ID dependent random number every subframe, the initial value must be changed every subframe and a different value must be generated for each UE and therefore an initial value may be created using a UE ID and a subframe number (or a corresponding slot number). It is preferable that the initial value be created such that a number indicating the UE ID and a number indicating the subframe not overlap when the initial value is expressed in binary form.

Figure 8:
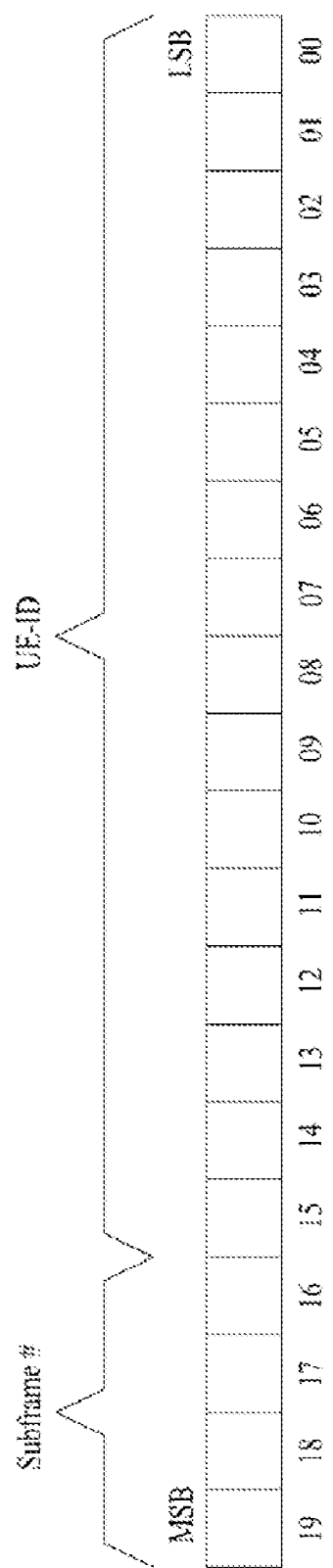
FIGS. 8 and 9 illustrate a method for creating an initial value used to generate a start position of a PDCCH search space using a UE ID and a subframe number according to an embodiment of the present invention.
Figure 9:
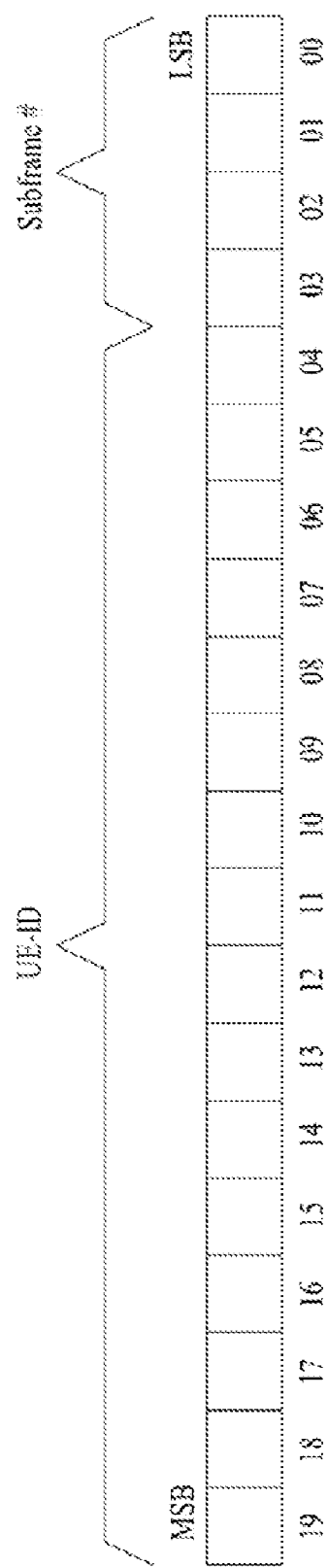

FIGS. 8 and 9 illustrate a method for creating an initial value used to generate a start position of a PDCCH search space using a UE ID and a subframe number according to an embodiment of the present invention.

Specifically, as shown in FIG. 8, when the initial value is expressed in binary form, the initial value can be created such that a 16-bit UE ID is placed at less significant bit positions including a Least Significant Bit (LSB) position of the binary value and a 4-bit subframe number is placed at more significant bit positions including a Most Significant Bit (MSB) position. The initial value created in this manner can be expressed as follows.

$$\{UE\text{-}ID\} \times 2^0 + \{subframe\#\} \times 2^{16} \quad \text{MATHEMATICAL EXPRESSION 8}$$

In addition, as shown in FIG. 9, when the initial value is expressed in binary form, the initial value can be created such that a UE ID is placed at more significant bit positions including a Most Significant Bit (MSB) position of the binary value and a subframe number is placed at less significant bit positions including a Least Significant Bit (LSB) position. In this case, the initial value can be expressed as follows.

$$\{UE\text{-}ID\} \times 2^4 + \{subframe\#\} \times 2^0 \quad \text{MATHEMATICAL EXPRESSION 9}$$

It is preferable that, when a PDCCH decoding region is randomized, randomization effects of each CCE aggregation level be different since the same physical CCE may be used even when different CCE aggregation levels are employed.

Figure 10:
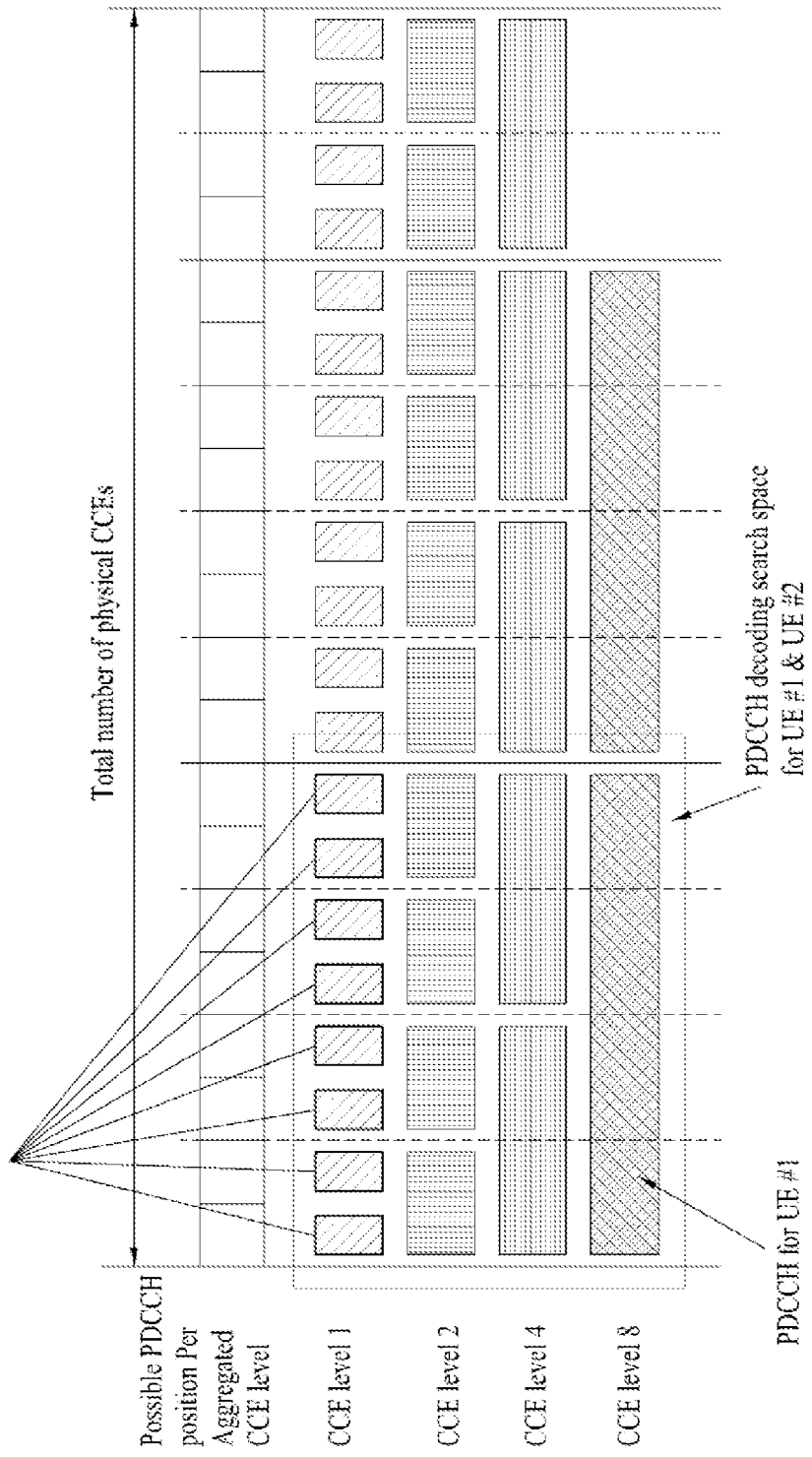
FIG. 10 illustrates an example wherein one of two UEs having different CCE aggregation levels fails to receive a PDCCH destined for the UE due to a PDCCH destined for the other UE.

FIG. 10 illustrates an example wherein one of two UEs having different CCE aggregation levels fails to receive a PDCCH destined for the UE due to a PDCCH destined for the other UE.

A problem may occur if the CCE region for PDCCH decoding is the same for all UEs even though their CCE aggregation levels are different. For example, it a PDCCH decoding region corresponding to 8 aggregated CCEs for transmitting a PDCCH to a UE1 must also be used for a UE 2 when the PDCCH is transmitted to the UE 1 using the CCE aggregation of 8 CCEs, a PDCCH may not be able to be transmitted to the UE 2 since a PDCCH decoding region for transmission to the UE2 is entirely covered by the PDCCH that uses the 8 aggregated CCEs.

To overcome this problem, an embodiment of the present invention suggests that a different identification dependent randomization number be generated for each CCE aggregation level. Specifically, the embodiment of the present invention suggests that information of each CCE aggregation level be incorporated into an initial value used to calculate a start position of a PDCCH search space. That is, a UE ID, a subframe number, and a CCE aggregation level may be used to create the initial value.

Figure 11:
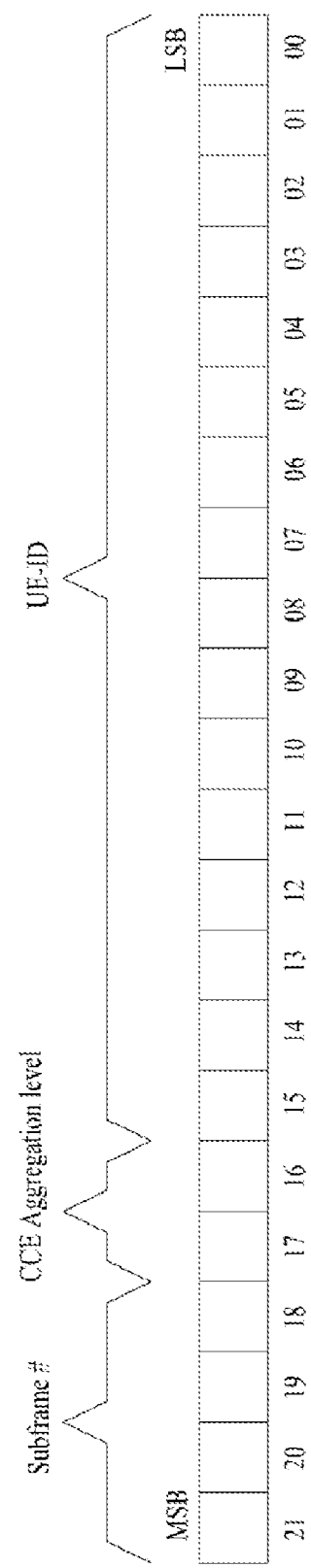
FIGS. 11 and 12 illustrate examples where a UE ID, a subframe number, and a CCE aggregation level are used to create an initial value according to an embodiment of the present invention.
Figure 12:
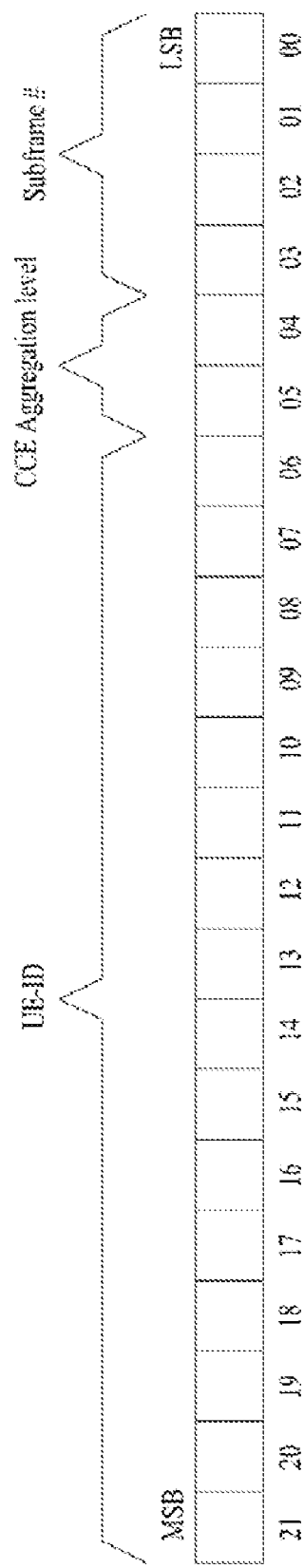

FIGS. 11 and 12 illustrate examples where a UE ID, a subframe number, and a CCE aggregation level are used to create an initial value according to an embodiment of the present invention.

Specifically, FIG. 11 illustrates an example wherein the initial value includes a subframe number, a CCE aggregation level, and a UE ID at bit positions sequentially from the MSB to the LSB positions and FIG. 12 illustrates an example wherein the initial value includes a UE ID, a CCE aggregation level, and a subframe number at bit positions sequentially from the MSB to the LSB positions. These information items may be arranged in any other order, provided that the initial value includes all the information items.

Alternatively, when the initial value generation methods of the first to fifth embodiments described above are used, an initial value including no subframe number may be input to generate sequences synchronously with the timings of radio frames and sequence values generated in each subframe may then be used one by one. In this case, the initial value can be created using a combination of the UE ID and the CCE aggregation level information since there is no need to incorporate the subframe information into the initial value.

Figure 13:
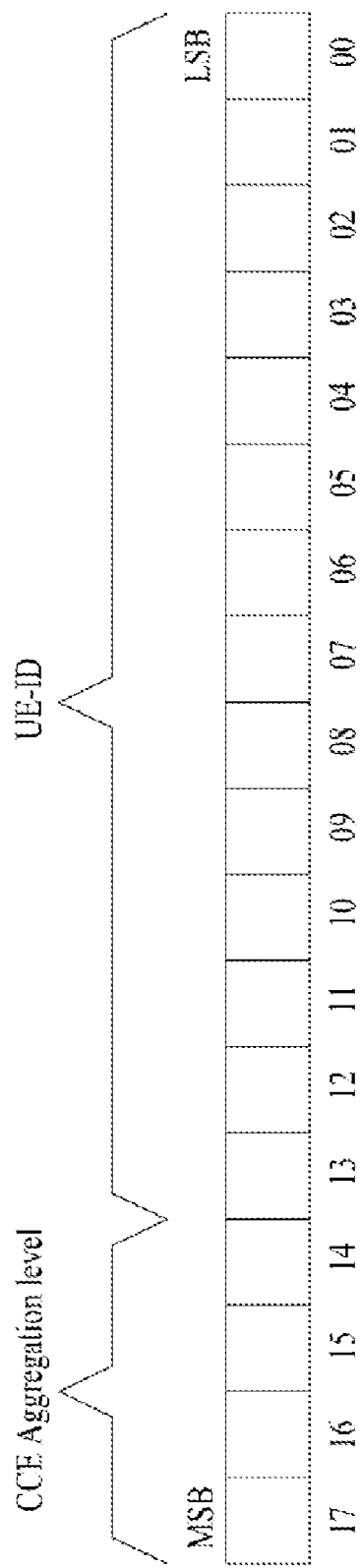
FIGS. 13 and 14 illustrate examples where an initial value used to calculate a start position of a PDCCH search space is created using a UE ID and a CCE aggregation level according to an embodiment of the present invention.
Figure 14:
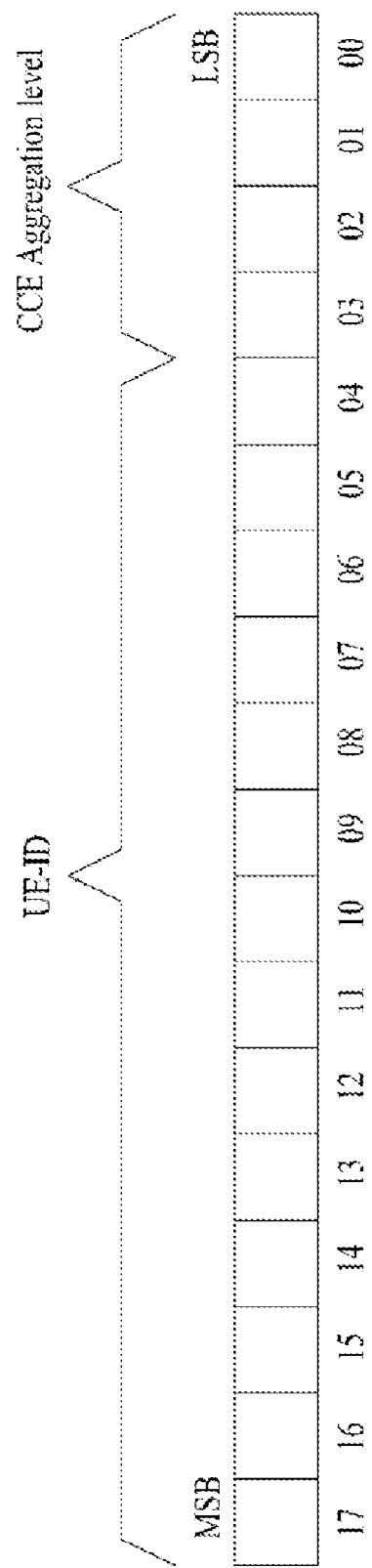

FIGS. 13 and 14 illustrate examples where an initial value used to calculate a start position of a PDCCH search space is created using a UE ID and a CCE aggregation level according to an embodiment of the present invention.

Although the initial value includes a CCE aggregation level and a UE ID at bit positions sequentially from the MSB to the LSB in the example of FIG. 13 and the initial value includes a CCE aggregation level and a UE ID at bit positions in the reverse order in the example of FIG. 14, the CCE aggregation level and the UE ID may be arranged in any order.

On the other hand, another embodiment of the present invention suggests that each of the constant values A, B, and D used in the first to fifth embodiments vary depending on the CCE aggregation level. Although the value C is represented by a function of the CCE aggregation level and thus varies according to circumstances, the values A, B, and D are constants preset at transmitting and receiving sides. However, in order to generate a different identification dependent randomization number pattern for each CCE aggregation level, the values A, B, and D may each be set to be different for each CCE aggregation level.

In a special embodiment, constant values, which are fixed regardless of the CCE aggregation level, may be used as the values A and D used in the first to fourth embodiments while only the value B is defined to be different for each CCE aggregation level. This allows a finally obtained sequence to be different for each CCE aggregation level without significantly changing the characteristics of the generated sequence.

Another possible method is to use only the UE ID as an initial value while especially using fixed, constant values as the values A, B, and D in the first to fifth embodiments since the value C inherently varies according to the CCE aggregation level. It is not necessary to define values A, B, and D that vary according to the CCE aggregation level in the above embodiments since a value randomized to some extent is generated through a modulo operation with the value D and the finally obtained identification dependent random number may vary through the modulo operation with the value C that varies according to the CCE aggregation level.

Reference will now be made in detail to parameter values of the generation equations for obtaining a start position of a PDCCH search space according to the first to fifth embodiments described above.

Using a computer, the present inventor found some values of the parameters A, B, and D of the generator which are good for each method. The good values are defined as follows and the present invention suggests best parameter values for each search criterion described below.

A start position of a PDCCH decoding region for decoding for each CCE aggregation level is obtained based on an identification dependent randomization number. The PDCCH decoding region should be synchronized between the base station and UEs and the period and timing of generation of an identification dependent randomization number should also be synchronized between all UEs that communicate with the base station. Thus, overlapping of PDCCH decoding regions can be minimized if identification dependent randomization numbers that UEs having different UE IDs use every subframe are different. This indicates that, even though some identification dependent randomization numbers are equal among identification dependent randomization numbers generated with different UE IDs, randomization effects can be achieved if the identification dependent randomization numbers are different only in a subframe in which a specific value is used.

In an embodiment of the present invention, a concept of the "number of hits" is defined as a criterion for determining performance according to each parameter value. Each of the UEs having different UE IDs generates identification dependent randomization numbers synchronously with radio frames and compares identification dependent randomization numbers used in subframes to determine the number of subframes which has used the same value and records the determined number of subframes as the "number of hits". Therefore, a distribution of the numbers of hits with all other possible UE IDs is measured for every UE ID that can be allocated and the distribution of the numbers of hits probabilistically determined when a specific generation method is used is set as one criterion for determining performance.

Figure 15:
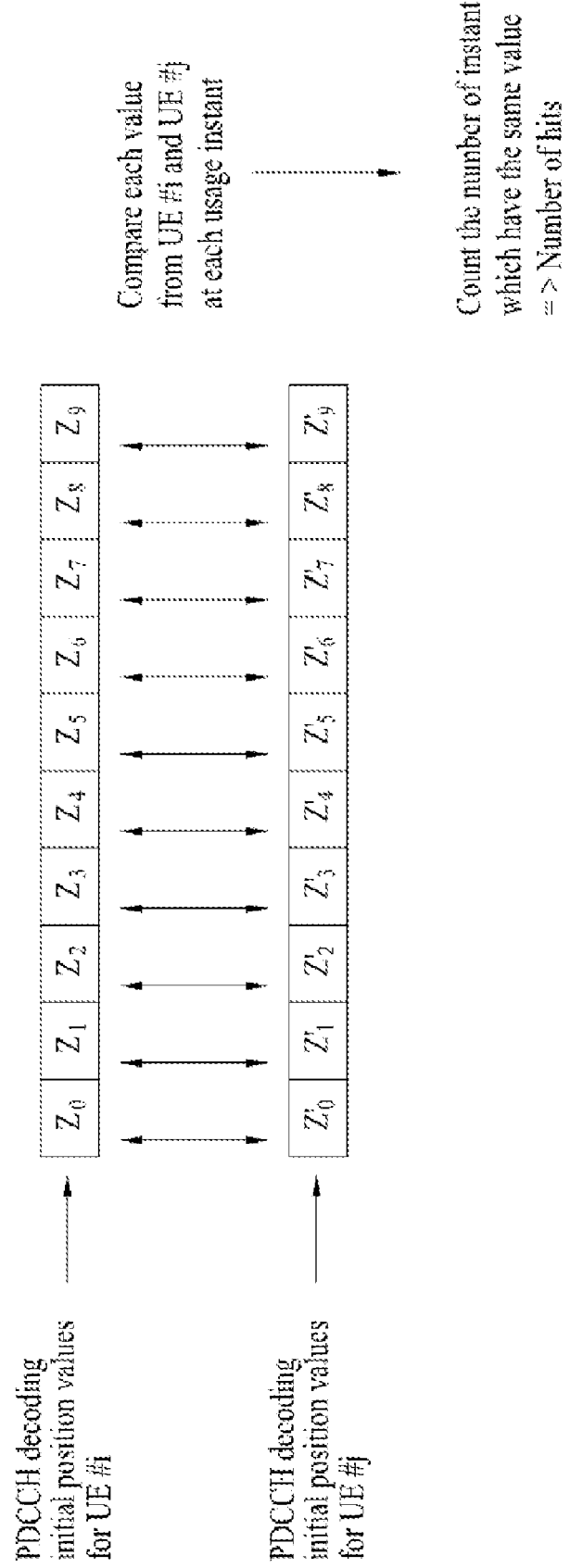
FIG. 15 illustrates the concept of the number of hits used for determining performance when parameter values are calculated according to an embodiment of the present invention.

FIG. 15 illustrates the concept of the number of hits used for determining performance when parameter values are calculated according to an embodiment of the present invention.

That is, the embodiment of the present invention suggests that, since 10 subframes are included in a radio frame in the 3GPP LTE as shown in FIG. 15, the number of possible hits be determined for subframe indices of 0, 1, . . . , 10 and the determined number of hits be used as a probability that UEs having two different UE IDs use the same PDCCH decoding region (i.e., as a criterion for determining performance).

On the other hand, an embodiment of the present invention suggests that a distribution map of an identification dependent randomization number(s) that can be generated from all input initial values that can be generated according to the generation method with specific parameters A, B, and D be taken into consideration as a second criterion for determining performance. Identification dependent randomization numbers generated using all generation methods suggested in the present invention are between 0 to C−1. Therefore, the embodiment of the present invention suggests that a distribution of integer values between 0 to C−1 generated for all initial values that can be input be measured and whether or not all generated values are as uniform as possible then be determined and the uniformity of the generated values then be used as a criterion for determining performance.

In this embodiment, the following performance indicators are selected from performance results. When specific parameters are used in each generation method, the following indicators are calculated and compared. Here, the average of values measured when the value C varies in a range from 96 to 3 is determined for each of the indicators.

1. Maximum number of hits
2. Average number of hits
3. Whether or not ID dependent randomization numbers have been generated uniformly in a range of 0 to C−1
4. Variance of probabilities that values between 0 to C−1 will be generated for determining whether or not ID dependent randomization numbers have been generated uniformly in a range of 0 to C−1

First, parameter values used in the method for generating a start position of a PDCCH search space according to the first embodiment are described below with reference to the above description.

Various values can be used as constant values A, B, and D that are predetermined and used at the transmitting and receiving sides in the generation method according to the first embodiment. Thus, it is difficult to measure performance of all possible values of A, B, and D using a computer. Therefore, values of A, B, and D that generally exhibited high performance were first confirmed using a computer and respective performance of specific combinations of A, B, and D was compared based on the confirmed values.

First, results of performance measurement using a computer showed that the value D exhibited highest performance when similar to the maximum value that can be expressed by the initial value x with A and B fixed to specific values. Results shown in Table 2 are part of performance measurement results indicating the probability that sequences generated for different UE IDs using an initial value created using only the UE IDs according to the first embodiment become equal in each subframe. The UE ID consists of 16 bits that correspond to 65536 ($=2^{16}$) values.

TABLE 2

| Parameters | | | | Probability per Number of Hits | | | | | | | | | | |
|---|---|---|---|---|---|---|---|---|---|---|---|---|---|---|
| A | B | C | D | 0 | 1 | 2 | 3 | 4 | 5 | 6 | 7 | 8 | 9 | 10 |
| 4093 | 7 | 96 | 65536 | 96.931% | 0.270% | 0.613% | 0.811% | 0.705% | 0.431% | 0.183% | 0.048% | 0.007% | 0.000% | 0.000% |
| 4093 | 7 | 86 | 65536 | 89.560% | 9.404% | 0.926% | 0.088% | 0.021% | 0.002% | 0.000% | 0.000% | 0.000% | 0.000% | 0.000% |
| 4093 | 7 | 76 | 65536 | 89.585% | 8.162% | 1.876% | 0.297% | 0.062% | 0.017% | 0.001% | 0.000% | 0.000% | 0.000% | 0.000% |
| 4093 | 7 | 66 | 65536 | 86.717% | 11.644% | 1.464% | 0.142% | 0.029% | 0.005% | 0.000% | 0.000% | 0.000% | 0.000% | 0.000% |
| 4093 | 7 | 56 | 65536 | 90.213% | 4.439% | 3.376% | 1.422% | 0.404% | 0.110% | 0.031% | 0.005% | 0.000% | 0.000% | 0.000% |
| 4093 | 7 | 46 | 65536 | 81.970% | 14.810% | 2.822% | 0.333% | 0.053% | 0.012% | 0.000% | 0.000% | 0.000% | 0.000% | 0.000% |
| 4093 | 7 | 36 | 65536 | 82.624% | 9.787% | 5.402% | 1.699% | 0.384% | 0.086% | 0.018% | 0.001% | 0.000% | 0.000% | 0.000% |
| 4093 | 7 | 26 | 65536 | 72.397% | 18.821% | 7.045% | 1.460% | 0.234% | 0.039% | 0.004% | 0.000% | 0.000% | 0.000% | 0.000% |
| 4093 | 7 | 16 | 65536 | 93.751% | 0.000% | 0.000% | 0.000% | 0.000% | 0.000% | 0.000% | 0.000% | 0.000% | 0.000% | 6.249% |
| 4093 | 7 | 6 | 65536 | 50.867% | 4.337% | 9.753% | 13.006% | 11.379% | 6.833% | 2.844% | 0.812% | 0.152% | 0.015% | 0.001% |
| 4093 | 7 | 96 | 65537 | 90.078% | 9.459% | 0.444% | 0.018% | 0.000% | 0.000% | 0.000% | 0.000% | 0.000% | 0.000% | 0.000% |
| 4093 | 7 | 86 | 65537 | 88.977% | 10.457% | 0.542% | 0.024% | 0.000% | 0.000% | 0.000% | 0.000% | 0.000% | 0.000% | 0.000% |
| 4093 | 7 | 76 | 65537 | 87.601% | 11.686% | 0.681% | 0.031% | 0.000% | 0.000% | 0.000% | 0.000% | 0.000% | 0.000% | 0.000% |
| 4093 | 7 | 66 | 65537 | 85.830% | 13.248% | 0.879% | 0.043% | 0.000% | 0.000% | 0.000% | 0.000% | 0.000% | 0.000% | 0.000% |
| 4093 | 7 | 56 | 65537 | 83.471% | 15.281% | 1.182% | 0.065% | 0.001% | 0.000% | 0.000% | 0.000% | 0.000% | 0.000% | 0.000% |
| 4093 | 7 | 46 | 65537 | 80.216% | 17.964% | 1.705% | 0.112% | 0.004% | 0.000% | 0.000% | 0.000% | 0.000% | 0.000% | 0.000% |
| 4093 | 7 | 36 | 65537 | 75.410% | 21.668% | 2.684% | 0.225% | 0.013% | 0.000% | 0.000% | 0.000% | 0.000% | 0.000% | 0.000% |
| 4093 | 7 | 26 | 65537 | 67.471% | 27.239% | 4.709% | 0.536% | 0.045% | 0.000% | 0.000% | 0.000% | 0.000% | 0.000% | 0.000% |
| 4093 | 7 | 16 | 65537 | 52.355% | 35.182% | 10.360% | 1.846% | 0.241% | 0.016% | 0.001% | 0.000% | 0.000% | 0.000% | 0.000% |
| 4093 | 7 | 6 | 65537 | 16.152% | 32.305% | 29.049% | 15.530% | 5.421% | 1.303% | 0.216% | 0.022% | 0.001% | 0.000% | 0.000% |
| 4093 | 7 | 96 | 131071 | 90.052% | 9.500% | 0.443% | 0.005% | 0.000% | 0.000% | 0.000% | 0.000% | 0.000% | 0.000% | 0.000% |
| 4093 | 7 | 86 | 131071 | 88.956% | 10.484% | 0.552% | 0.008% | 0.000% | 0.000% | 0.000% | 0.000% | 0.000% | 0.000% | 0.000% |
| 4093 | 7 | 76 | 131071 | 87.603% | 11.667% | 0.714% | 0.015% | 0.001% | 0.000% | 0.000% | 0.000% | 0.000% | 0.000% | 0.000% |
| 4093 | 7 | 66 | 131071 | 85.869% | 13.150% | 0.959% | 0.022% | 0.001% | 0.000% | 0.000% | 0.000% | 0.000% | 0.000% | 0.000% |
| 4093 | 7 | 56 | 131071 | 83.506% | 15.186% | 1.268% | 0.039% | 0.001% | 0.000% | 0.000% | 0.000% | 0.000% | 0.000% | 0.000% |
| 4093 | 7 | 46 | 131071 | 80.272% | 17.820% | 1.822% | 0.082% | 0.003% | 0.000% | 0.000% | 0.000% | 0.000% | 0.000% | 0.000% |
| 4093 | 7 | 36 | 131071 | 75.448% | 21.532% | 2.839% | 0.173% | 0.008% | 0.000% | 0.000% | 0.000% | 0.000% | 0.000% | 0.000% |
| 4093 | 7 | 26 | 131071 | 67.563% | 26.983% | 4.938% | 0.478% | 0.035% | 0.002% | 0.000% | 0.000% | 0.000% | 0.000% | 0.000% |
| 4093 | 7 | 16 | 131071 | 52.421% | 34.996% | 10.518% | 1.826% | 0.218% | 0.002% | 0.001% | 0.000% | 0.000% | 0.000% | 0.000% |
| 4093 | 7 | 6 | 131071 | 16.152% | 32.303% | 29.064% | 15.505% | 5.436% | 1.305% | 0.212% | 0.022% | 0.001% | 0.000% | 0.000% |

TABLE 2-continued

| Parameters | | | | Probability per Number of Hits | | | | | | | | | | |
|---|---|---|---|---|---|---|---|---|---|---|---|---|---|---|
| A | B | C | D | 0 | 1 | 2 | 3 | 4 | 5 | 6 | 7 | 8 | 9 | 10 |
| 4093 | 7 | 96 | 1048576 | 96.933% | 0.273% | 0.608% | 0.810% | 0.705% | 0.423% | 0.181% | 0.056% | 0.011% | 0.001% | 0.000% |
| 4093 | 7 | 86 | 1048576 | 89.526% | 9.415% | 0.980% | 0.075% | 0.004% | 0.000% | 0.000% | 0.000% | 0.000% | 0.000% | 0.000% |
| 4093 | 7 | 76 | 1048576 | 89.539% | 8.158% | 1.963% | 0.305% | 0.032% | 0.003% | 0.000% | 0.000% | 0.000% | 0.000% | 0.000% |
| 4093 | 7 | 66 | 1048576 | 86.711% | 11.603% | 1.538% | 0.135% | 0.011% | 0.001% | 0.000% | 0.000% | 0.000% | 0.000% | 0.000% |
| 4093 | 7 | 56 | 1048576 | 90.226% | 4.407% | 3.331% | 1.485% | 0.448% | 0.088% | 0.013% | 0.001% | 0.000% | 0.000% | 0.000% |
| 4093 | 7 | 46 | 1048576 | 81.991% | 14.739% | 2.868% | 0.363% | 0.037% | 0.002% | 0.000% | 0.000% | 0.000% | 0.000% | 0.000% |
| 4093 | 7 | 36 | 1048576 | 82.819% | 9.543% | 5.299% | 1.831% | 0.420% | 0.076% | 0.010% | 0.000% | 0.000% | 0.000% | 0.000% |
| 4093 | 7 | 26 | 1048576 | 72.450% | 18.720% | 7.031% | 1.552% | 0.226% | 0.020% | 0.000% | 0.000% | 0.000% | 0.000% | 0.000% |
| 4093 | 7 | 16 | 1048576 | 93.751% | 0.000% | 0.000% | 0.000% | 0.000% | 0.000% | 0.000% | 0.000% | 0.000% | 0.000% | 6.249% |
| 4093 | 7 | 6 | 1048576 | 50.873% | 4.339% | 9.758% | 12.995% | 11.371% | 6.828% | 2.852% | 0.815% | 0.152% | 0.016% | 0.001% |
| 4093 | 7 | 96 | 1048593 | 90.946% | 7.811% | 1.145% | 0.089% | 0.007% | 0.001% | 0.000% | 0.000% | 0.000% | 0.000% | 0.000% |
| 4093 | 7 | 86 | 1048593 | 89.008% | 10.392% | 0.580% | 0.020% | 0.000% | 0.000% | 0.000% | 0.000% | 0.000% | 0.000% | 0.000% |
| 4093 | 7 | 76 | 1048593 | 87.581% | 11.711% | 0.690% | 0.017% | 0.000% | 0.000% | 0.000% | 0.000% | 0.000% | 0.000% | 0.000% |
| 4093 | 7 | 66 | 1048593 | 87.595% | 9.980% | 2.141% | 0.265% | 0.019% | 0.001% | 0.000% | 0.000% | 0.000% | 0.000% | 0.000% |
| 4093 | 7 | 56 | 1048593 | 89.444% | 5.445% | 3.401% | 1.315% | 0.333% | 0.055% | 0.006% | 0.001% | 0.000% | 0.000% | 0.000% |
| 4093 | 7 | 46 | 1048593 | 95.658% | 0.043% | 0.191% | 0.509% | 0.891% | 1.070% | 0.892% | 0.510% | 0.190% | 0.041% | 0.004% |
| 4093 | 7 | 36 | 1048593 | 80.612% | 12.724% | 5.202% | 1.240% | 0.198% | 0.021% | 0.002% | 0.001% | 0.000% | 0.000% | 0.000% |
| 4093 | 7 | 26 | 1048593 | 92.317% | 0.074% | 0.337% | 0.903% | 1.578% | 1.892% | 1.578% | 0.902% | 0.338% | 0.075% | 0.007% |
| 4093 | 7 | 16 | 1048593 | 52.396% | 35.073% | 10.456% | 1.826% | 0.225% | 0.022% | 0.002% | 0.000% | 0.000% | 0.000% | 0.000% |
| 4093 | 7 | 6 | 1048593 | 66.700% | 0.325% | 1.465% | 3.905% | 6.836% | 8.206% | 6.836% | 3.904% | 1.465% | 0.325% | 0.032% |
| 4093 | 7 | 96 | 2097143 | 90.048% | 9.514% | 0.425% | 0.012% | 0.000% | 0.000% | 0.000% | 0.000% | 0.000% | 0.000% | 0.000% |
| 4093 | 7 | 86 | 2097143 | 88.997% | 10.412% | 0.572% | 0.019% | 0.000% | 0.000% | 0.000% | 0.000% | 0.000% | 0.000% | 0.000% |
| 4093 | 7 | 76 | 2097143 | 87.614% | 11.655% | 0.704% | 0.027% | 0.000% | 0.000% | 0.000% | 0.000% | 0.000% | 0.000% | 0.000% |
| 4093 | 7 | 66 | 2097143 | 85.845% | 13.210% | 0.911% | 0.034% | 0.001% | 0.000% | 0.000% | 0.000% | 0.000% | 0.000% | 0.000% |
| 4093 | 7 | 56 | 2097143 | 83.487% | 15.250% | 1.200% | 0.063% | 0.001% | 0.000% | 0.000% | 0.000% | 0.000% | 0.000% | 0.000% |
| 4093 | 7 | 46 | 2097143 | 80.294% | 17.816% | 1.765% | 0.120% | 0.005% | 0.000% | 0.000% | 0.000% | 0.000% | 0.000% | 0.000% |
| 4093 | 7 | 36 | 2097143 | 75.434% | 21.612% | 2.724% | 0.217% | 0.013% | 0.000% | 0.000% | 0.000% | 0.000% | 0.000% | 0.000% |
| 4093 | 7 | 26 | 2097143 | 67.573% | 26.986% | 4.897% | 0.512% | 0.031% | 0.001% | 0.000% | 0.000% | 0.000% | 0.000% | 0.000% |
| 4093 | 7 | 16 | 2097143 | 52.462% | 34.907% | 10.552% | 1.859% | 0.206% | 0.014% | 0.000% | 0.000% | 0.000% | 0.000% | 0.000% |
| 4093 | 7 | 6 | 2097143 | 16.176% | 32.240% | 29.086% | 15.553% | 5.420% | 1.280% | 0.216% | 0.027% | 0.002% | 0.000% | 0.000% |

As shown in Table 2, the probability that collision occurs (i.e., UE IDs become equal) in all of the 10 subframes is 6.429% when the value D is equal to an initial value of $2^{16}$ and the value C is 16. However, this phenomenon disappears when the value D is greater than $2^{16}$. It can be seen from Table 2 that the phenomenon disappears when the value D is 65537 or 131071 which are greater than $2^{16}$. However, such poor performance results occur when a value much greater than $2^{16}$ is selected as the value D. That is, such results occur when the value D is 1048576 or 1048593. Although performance is increased when the value D is 2097143, the performance is, on average, lower than that when a value which is close to $2^{16}$ and greater than $2^{16}$ is used as the value D.

Based on these facts, an embodiment of the present invention suggests that a prime number greater than $2^N$ and less than $2^{N+1}$ be used as the parameter value D when the initial value is expressed by N bits. Preferably, the smallest prime number greater than $2^N$ is used as the parameter value D. Specifically, an embodiment suggests that a value of $2^{16}+1$ be used as the value D when N=16, a value of $2^{18}+3$ be used as the value D when N=18, and a value of $2^{22}+15$ be used as the value D when N=22. The reason why this embodiment suggests that the smallest prime number that satisfies performance requirements be used as the value D is that the simplicity of phenomenon increases, approaching that of normal phenomena, as the value D decreases.

Consequently, an embodiment of the present invention suggests that a value of 65537 be used as the parameter D of the start position generation equation according to the first embodiment of the present invention when it is assumed that the initial value for the generation equation is generated based on a 16-bit UE ID.

On the other hand, to select a parameter value of B, performance was measured using various values of A and various values of B with the value D being fixed to a specific value. Such measurement results showed that the parameter B has no significant influence on the variance of the probabilistic distribution of generation of each value of between 0 and C−1, the average number of collisions, and the maximum number of collisions when the parameters D and A are prime. The following Table 3 shows part of the various performance measurement results.

TABLE 3

| A | B | D | Variance of probability of generation for each number between 0 and c-1 | Average number of Hits | Maximum number of hits |
|---|---|---|---|---|---|
| 32789 | 0 | 1048567 | 8.29439756700E−04 | 1.31635866660E+00 | 6 |
| 32789 | 7 | 1048567 | 8.29439750350E−04 | 1.31635868060E+00 | 6 |
| 32789 | 3821 | 1048567 | 8.29439765480E−04 | 1.31635878580E+00 | 6 |
| 33037 | 0 | 1048567 | 8.29439348280E−04 | 1.31635500230E+00 | 7 |
| 33037 | 7 | 1048567 | 8.29439329360E−04 | 1.31635487980E+00 | 7 |
| 33037 | 3821 | 1048567 | 8.29439315490E−04 | 1.31635479360E+00 | 7 |
| 34421 | 0 | 1048567 | 8.29439612880E−04 | 1.31635698230E+00 | 10 |
| 34421 | 7 | 1048567 | 8.29439589840E−04 | 1.31635668660E+00 | 10 |
| 34421 | 3821 | 1048567 | 8.29439602550E−04 | 1.31635693940E+00 | 10 |
| 36061 | 0 | 1048567 | 8.29439625390E−04 | 1.31635759420E+00 | 8 |

TABLE 3-continued

| A | B | D | Variance of probability of generation for each number between 0 and c-1 | Average number of Hits | Maximum number of hits |
|---|---|---|---|---|---|
| 36061 | 7 | 1048567 | 8.29439596140E−04 | 1.31635773990E+00 | 8 |
| 36061 | 3821 | 1048567 | 8.29439654740E−04 | 1.31635777670E+00 | 8 |
| 41189 | 0 | 1048567 | 8.29441337570E−04 | 1.31637294490E+00 | 6 |
| 41189 | 7 | 1048567 | 8.29441321130E−04 | 1.31637275310E+00 | 6 |
| 41189 | 3821 | 1048567 | 8.29441026210E−04 | 1.31637274940E+00 | 6 |
| 43789 | 0 | 1048567 | 8.29675510000E−04 | 1.31860997820E+00 | 7 |
| 43789 | 7 | 1048567 | 8.29674822710E−04 | 1.31859473170E+00 | 7 |
| 43789 | 3821 | 1048567 | 8.29673565670E−04 | 1.31860202780E+00 | 7 |
| 47653 | 0 | 1048567 | 8.29440200970E−04 | 1.31636344580E+00 | 8 |
| 47653 | 7 | 1048567 | 8.29440320540E−04 | 1.31636344670E+00 | 8 |
| 47653 | 3821 | 1048567 | 8.29440282120E−04 | 1.31636322130E+00 | 8 |

Therefore, an embodiment of the present invention suggests that the parameter values D and A be set to be prime and the parameter value B be set to a very small integer or 0. The complexity of calculation can be reduced when the value B is 0 or approaches 0.

Consequently, a preferred embodiment of the present invention suggests that the parameter value B be set to "0" in the generation equation of the first embodiment.

On the other hand, to select a parameter value A, performance was measured using an available prime number less than the value D while fixing the value B, which is determined to have no significant influence on performance, to a specific value and fixing the value D to a value that exhibited high performance according to the initial value. The following Table 4 shows part of such performance measurement results.

TABLE 4

| A | B | D | Variance of probability of generation for each number between 0 and c-1 | Average number of Hits | Maximum number of hits |
|---|---|---|---|---|---|
| 39827 | 7 | 65537 | 8.29439188640E−04 | 1.31635211090E+00 | 6 |
| 34231 | 7 | 65537 | 8.29439188930E−04 | 1.31635211140E+00 | 6 |
| 46889 | 7 | 65537 | 8.29439189470E−04 | 1.31635211190E+00 | 6 |
| 52289 | 7 | 65537 | 8.29439190000E−04 | 1.31635211190E+00 | 6 |
| 55717 | 7 | 65537 | 8.29439189710E−04 | 1.31635211190E+00 | 6 |
| 53831 | 7 | 65537 | 8.29439189320E−04 | 1.31635211190E+00 | 6 |
| 32993 | 7 | 65537 | 8.29439189850E−04 | 1.31635211230E+00 | 6 |
| 50923 | 7 | 65537 | 8.29439190530E−04 | 1.31635211280E+00 | 6 |
| 56131 | 7 | 65537 | 8.29439190290E−04 | 1.31635211280E+00 | 6 |
| 60889 | 7 | 65537 | 8.29439190530E−04 | 1.31635211280E+00 | 6 |
| 63601 | 7 | 65537 | 8.29439190390E−04 | 1.31635211280E+00 | 6 |
| 53437 | 7 | 65537 | 8.29439190780E−04 | 1.31635211280E+00 | 6 |
| 40151 | 7 | 65537 | 8.29439190530E−04 | 1.31635211280E+00 | 6 |
| 46831 | 7 | 65537 | 8.29439190190E−04 | 1.31635211280E+00 | 6 |
| 36011 | 7 | 65537 | 8.29439190820E−04 | 1.31635211330E+00 | 6 |
| 64747 | 7 | 65537 | 8.29439190630E−04 | 1.31635211330E+00 | 6 |
| 39041 | 7 | 65537 | 8.29439190680E−04 | 1.31635211330E+00 | 6 |
| 47609 | 7 | 65537 | 8.29439190820E−04 | 1.31635211330E+00 | 6 |
| 34501 | 7 | 65537 | 8.29439191160E−04 | 1.31635211330E+00 | 6 |
| 36821 | 7 | 65537 | 8.29439190820E−04 | 1.31635211330E+00 | 6 |
| 42061 | 7 | 65537 | 8.29439191210E−04 | 1.31635211330E+00 | 6 |
| 34703 | 7 | 65537 | 8.29439190820E−04 | 1.31635211330E+00 | 6 |
| 35863 | 7 | 65537 | 8.29439190730E−04 | 1.31635211330E+00 | 6 |
| 47639 | 7 | 65537 | 8.29439190870E−04 | 1.31635211330E+00 | 6 |
| 51767 | 7 | 65537 | 8.29439190820E−04 | 1.31635211330E+00 | 6 |
| 40627 | 7 | 65537 | 8.29439191450E−04 | 1.31635211370E+00 | 6 |
| 40883 | 7 | 65537 | 8.29439191450E−04 | 1.31635211370E+00 | 6 |
| 41011 | 7 | 65537 | 8.29439191160E−04 | 1.31635211370E+00 | 6 |
| 44483 | 7 | 65537 | 8.29439191310E−04 | 1.31635211370E+00 | 6 |
| 45179 | 7 | 65537 | 8.29439191120E−04 | 1.31635211370E+00 | 6 |
| 45523 | 7 | 65537 | 8.29439191210E−04 | 1.31635211370E+00 | 6 |
| 58043 | 7 | 65537 | 8.29439191160E−04 | 1.31635211370E+00 | 6 |
| 59083 | 7 | 65537 | 8.29439191450E−04 | 1.31635211370E+00 | 6 |
| 64499 | 7 | 65537 | 8.29439191410E−04 | 1.31635211370E+00 | 6 |
| 41521 | 7 | 65537 | 8.29439191210E−04 | 1.31635211370E+00 | 6 |
| 42281 | 7 | 65537 | 8.29439191310E−04 | 1.31635211370E+00 | 6 |
| 43577 | 7 | 65537 | 8.29439191210E−04 | 1.31635211370E+00 | 6 |
| 45737 | 7 | 65537 | 8.29439191450E−04 | 1.31635211370E+00 | 6 |
| 49481 | 7 | 65537 | 8.29439191500E−04 | 1.31635211370E+00 | 6 |
| 57041 | 7 | 65537 | 8.29439191450E−04 | 1.31635211370E+00 | 6 |
| 34877 | 7 | 65537 | 8.29439191410E−04 | 1.31635211370E+00 | 6 |
| 41957 | 7 | 65537 | 8.29439191210E−04 | 1.31635211370E+00 | 6 |

TABLE 4-continued

| A | B | D | Variance of probability of generation for each number between 0 and c-1 | Average number of Hits | Maximum number of hits |
|---|---|---|---|---|---|
| 45389 | 7 | 65537 | 8.29439191410E−04 | 1.31635211370E+00 | 6 |
| 61861 | 7 | 65537 | 8.29439191500E−04 | 1.31635211370E+00 | 6 |
| ... | ... | ... | ... | ... | ... |
| 51977 | 7 | 65537 | 8.29439195530E−04 | 1.31635211740E+00 | 9 |
| 61441 | 7 | 65537 | 8.29439193350E−04 | 1.31635211510E+00 | 9 |
| 64513 | 7 | 65537 | 8.29439196010E−04 | 1.31635211790E+00 | 9 |
| 65521 | 7 | 65537 | 8.29439192330E−04 | 1.31635211370E+00 | 9 |
| 34607 | 7 | 65537 | 8.29439192670E−04 | 1.31635211510E+00 | 9 |
| 53239 | 7 | 65537 | 8.29439196260E−04 | 1.31635211840E+00 | 9 |
| 63863 | 7 | 65537 | 8.29439194270E−04 | 1.31635211650E+00 | 9 |

In Table 4, values of "A" exhibiting the smallest numbers of collisions are first arranged and remaining values are arranged in decreasing order of the average number of collisions. That is, the value of A located at an upper portion of Table 4 exhibits high performance in terms of performance indicators. Thus, an embodiment of the present invention suggests that one of the values written above symbols "..." in Table 4 be used as the value A. Particularly, a preferred embodiment of the present invention suggests that a value of 39827 written at the top of Table 4 be used as the value A.

Consequently, a preferred embodiment of the present invention suggests that values of 39827, 0, and 65537 be used respectively as the parameter values A, B, and D of the generation equation according to the first embodiment of the present invention. However, when it is necessary to use other parameter values according to system requirements, values selected from those written in the following table can be used as the parameter values A, B, and D.

TABLE 5

| A | B | D |
|---|---|---|
| 39827, 34231, 46889, 52289 | 0, 1, 3, 5, 7 | $2^{16}+1, 2^{18}+3, 2^{20}+7, 2^{22}+15$ |

The equations for calculating a start position of a PDCCH search space according to the second to fourth embodiments are substantially identical to that of the first embodiment in terms of their meanings. Accordingly, the present invention suggests that values of 39827, 0, and 65537 also be used respectively as the parameter values A, B, and D in the second to fourth embodiments. In this case, values written in Table 5 can be used as the parameter values A, B, and D when it is necessary to use parameter values other than 39827, 0, and 65537 according to system requirements.

The parameters of the generation equation used in the fifth embodiment of the present invention can also be determined in a manner similar to the method described above. The present inventor also measured various performance criteria for the parameters of the generation equation of the fifth embodiment and suggests that the following combinations of parameters be used.

TABLE 6

| A | B | D |
|---|---|---|
| 7 | 16 | $2^{20}$ |
| 15 | 32 | $2^{20}$ |
| 31 | 64 | $2^{20}$ |

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims.

Accordingly, the invention should not be limited to the specific embodiments described herein, but should be accorded the broadest scope consistent with the principles and novel features disclosed herein.

The above embodiments can be applied not only to the 3GPP LTE system but also to various other systems that need to transmit a downlink control channel to each UE.

What is claimed is:

1. A method for decoding at a User Equipment (UE), the method comprising:
   receiving a Physical Downlink Control Channel (PDCCH) from a base station during a subframe k; and
   decoding a set of PDCCH candidates within a search space of the PDCCH during the subframe k, wherein each PDCCH candidate of the set of PDCCH candidates comprises a defined number of control channel elements (CCEs),
   wherein the CCEs, for a first PDCCH candidate of the set of PDCCH candidates, are consecutively located from a variable position within the subframe k, and
   wherein the variable position within the subframe k is determined, for the first PDCCH candidate of the set of PDCCH candidates, based upon the variable position within a previous subframe of the subframe k,
   wherein the CCEs corresponding to a specific PDCCH candidate of the set of PDCCH candidates are given by using a total number of CCEs included in the subframe k and the number of CCEs corresponding to the specific PDCCH candidate.

2. The method of claim 1, wherein the subframe k comprises a control region, and wherein the total number of CCEs are located in the control region.

3. The method of claim 1, wherein the subframe k comprises a control region having a size, wherein the size of the control region is defined by the total number of CCEs.

4. The method of claim 1, wherein the number of CCEs, for each PDCCH candidate of the set of PDCCH candidates, is either 4 or 8.

5. The method of claim 1, wherein when the number of CCEs, for each PDCCH candidate of the set of PDCCH candidates, is greater than 1, the number of CCEs, for each PDCCH candidate of the set of PDCCH candidates, is an even number.

6. The method of claim 1, wherein the number of CCEs, for each PDCCH candidate of the set of PDCCH candidates, is one of 1, 2, 4 or 8.

7. The method of claim 1, wherein the CCEs, for the first PDCCH candidate of the set of PDCCH candidates, are consecutively located from the variable position within the subframe k to form contiguously located CCEs.

8. The method of claim 1, wherein the search space is a search space that is specific to the UE.

9. A user equipment (UE), comprising:
   a receiver configured to receive a Physical Downlink Control Channel (PDCCH) from a base station during a subframe k; and
   a decoder configured to decode a set of PDCCH candidates within a search space of the PDCCH during the subframe k, wherein each PDCCH candidate of the set of PDCCH candidates comprises a defined number of control channel elements (CCEs),
   wherein the CCEs, for a first PDCCH candidate of the set of PDCCH candidates, are consecutively located from a variable position within the subframe k, and
   wherein the variable position within the subframe k is determined, for the first PDCCH candidate of the set of PDCCH candidates, based upon the variable position within a previous subframe of the subframe k,
   wherein the CCEs corresponding to a specific PDCCH candidate of the set of PDCCH candidates are given by using a total number of CCEs included in the subframe k and the number of CCEs corresponding to the specific PDCCH candidate.

10. The user equipment (UE) of claim 9, wherein the subframe k comprises a control region, and wherein the total number of CCEs are located in the control region.

11. The user equipment (UE) of claim 9, wherein the subframe k comprises a control region having a size, wherein the size of the control region is defined by the total number of CCEs.

12. The user equipment (UE) of claim 9, wherein the number of CCEs, for each PDCCH candidate of the set of PDCCH candidates, is either 4 or 8.

13. The user equipment (UE) of claim 9, wherein when the number of CCEs, for each PDCCH candidate of the set of PDCCH candidates, is greater than 1, the number of CCEs, for each PDCCH candidate of the set of PDCCH candidates, is an even number.

14. The user equipment (UE) of claim 9, wherein the number of CCEs, for each PDCCH candidate of the set of PDCCH candidates, is one of 1, 2, 4 or 8.

15. The user equipment (UE) of claim 9, wherein the CCEs, for the first PDCCH candidate of the set of PDCCH candidates, are consecutively located from the variable position within the subframe k to form contiguously located CCEs.

16. The user equipment (UE) of claim 9, wherein the search space is a search space that is specific to the UE.

* * * * *